United States Patent [19] [11] Patent Number: 4,542,029
Caner et al. [45] Date of Patent: Sep. 17, 1985

[54] HOT FILLED CONTAINER

[75] Inventors: Ali R. Caner, Woodstock; Kenneth B. Spencer, Barrington, both of Ill.

[73] Assignee: American Can Company, Greenwich, Conn.

[21] Appl. No.: 582,159

[22] Filed: Feb. 27, 1984

Related U.S. Application Data

[63] Continuation of Ser. No. 275,395, Jun. 19, 1981.

[51] Int. Cl.[4] ............ B65D 21/02; B65D 41/14
[52] U.S. Cl. .................................. 426/127; 150/55; 206/519; 206/520; 220/66; 220/359; 426/106; 426/131; 426/398; 426/399
[58] Field of Search .......... 206/519, 520; 150/0.5, 150/55; 220/66, 359; 229/43; 426/111, 127, 131, 126

[56] References Cited

U.S. PATENT DOCUMENTS

| D. 275,179 | 8/1984 | Spenser et al. | |
|---|---|---|---|
| 1,789,946 | 1/1931 | Rector | |
| 2,736,656 | 2/1956 | Marshall | 220/359 |
| 2,894,844 | 7/1959 | Shakman | 150/0.5 |
| 2,898,003 | 8/1959 | Wilson et al. | |
| 3,043,461 | 7/1962 | Glassco | 150/0.5 |
| 3,054,679 | 9/1962 | Bradford | |
| 3,262,626 | 7/1966 | Davis | |
| 3,391,847 | 7/1968 | Christine | 220/359 |
| 3,400,853 | 9/1968 | Jacobsen | 220/66 |
| 3,409,167 | 11/1968 | Blanchard | 150/0.5 |
| 3,426,939 | 2/1969 | Young | 220/66 |
| 3,492,773 | 2/1970 | Bergstrom | 220/66 |
| 3,527,020 | 9/1970 | Mancini | |
| 3,530,917 | 9/1970 | Donovan | 206/519 |
| 3,615,707 | 11/1971 | Filz | |
| 3,620,435 | 11/1971 | Sogi | |
| 3,765,595 | 10/1973 | Bernhardt | |
| 3,779,447 | 12/1973 | Bemiss | |
| 3,831,745 | 8/1974 | Rump | 206/520 |
| 3,890,448 | 6/1975 | Ito | |
| 3,890,767 | 6/1975 | Cawurse | |
| 3,893,567 | 7/1975 | Davis et al. | |
| 3,977,153 | 8/1976 | Schrenk | |
| 4,040,233 | 8/1977 | Ualyi | |
| 4,125,632 | 11/1978 | Vosti et al. | |
| 4,161,562 | 7/1979 | Yoshikawa | |
| 4,171,084 | 10/1979 | Smith | |
| 4,196,841 | 4/1980 | Smith | 229/43 |
| 4,211,338 | 7/1980 | Bablitz | |

FOREIGN PATENT DOCUMENTS

| 1061643 | 7/1959 | Fed. Rep. of Germany |
| 1302048 | 10/1969 | Fed. Rep. of Germany |
| 2130682 | 1/1973 | Fed. Rep. of Germany |
| 2207904 | 8/1973 | Fed. Rep. of Germany |
| 1284805 | 8/1972 | United Kingdom |
| 1441666 | 7/1976 | United Kingdom |

Primary Examiner—George E. Lowrance
Attorney, Agent, or Firm—Paul R. Audet; Warren N. Low

[57] ABSTRACT

A container body made of thermoplastic materials, after being filled with a hot liquid, is then sealed by a flat closure disc adhesively contacting a peripheral lip formed around the top of the body. The bottom of the container body is formed with annular grooves to define a diaphragm which flexes inwardly with the closure disc upon cooling of the hot filled liquid to substantially dissipate the high internal vacuum which is formed in the container head space. The bottom of the container body has a reinforced pedestal base formed with stacking ledges to facilitate nesting of empty bodies for shipment and storage.

9 Claims, 6 Drawing Figures

HOT FILLED CONTAINER

This application is a continuation, of application Ser. No. 275,395, filed June 19, 1981.

BACKGROUND OF THE INVENTION

This invention relates to the filling and hermetic sealing of plastic-bodied containers with hot liquid or semi-liquid products, and in particular to improvements in the methods and structures for accomplishing same without deformation to the side wall of the container or premature breaking of the seal.

Recently there has been a demand for a thermoplastic container for storing jams which must be heated to a liquid or semi-liquid state at temperatures of up to about 190° F. to facilitate filling into the container, and must then be hermetically sealed with a heat sealed peelable closure disc. This container can be used to package foods commonly classified as hot fillable, such as jams, fruit juices, and others. By hot-filling at a temperature of 190° F. the container and contents are sterilized and do not require additional preservatives. The higher the temperatures that must be used, the greater the likelihood of creating stresses on the container and/or seal because of high internal vacuums developed upon subsequent cooling of a product, primarily because of the condensation of steam in the head space of the sealed container. It is important that the side wall of the container be kept free of deformation or paneling while at the same time maintaining the hermetic seal to prevent spoilage of the product during shipping and storage.

In the past it has been known to construct a thermoplastic-bodied container for storing motor oils with a flexible bottom so that depletion of gaseous components causing a change in the internal pressure can be compensated for by the flexing action on the bottom as described in U.S. Pat. No. 3,409,167 to Blanchard. The container of that patent was formed with a relatively thick side wall and a relatively thin bottom wall to prevent paneling to the side wall while permitting flexing of the bottom wall, as set forth in column 4, lines 3–10 thereof, for example.

OBJECTS OF THE INVENTION

It is the principal object of the present invention to provide a hermetically sealed thermoplastic bodied container which is capable of holding hot filled products such as jams or the like, and which can be easily opened by simply peeling the container closure from the container body.

Another object is to provide such a container construction which permits the use of a peelable closure having a peel strength which is sufficiently low to permit easy opening by the consumer, and yet high enough to prevent rupture of the seal when subjected to the conditions under which the container is filled and sealed.

Yet another object of the invention to provide such a container which is provided with flexible top and bottom portions which are adapted to move inwardly as the hot filled product cools to thus prevent paneling of the side wall of the container and rupture of its hermetic seal.

Still another object of the invention is to improve the wall construction of hermetically sealed thermoplastic containers.

SUMMARY OF THE INVENTION

In accordance with the instant invention a uniformly thick thermoformed container body made of thermoplastic materials having a plurality of layers including a barrier layer is formed with a lip portion around its periphery to facilitate sealing with an easily peelable heat-sealed closure disc made of a flexible flat sheet material after the container has been filled with a hot liquid. The bottom wall and the top closure disc of the container are formed to effect diaphragmatic flexing to relieve the internal vacuum resulting from subsequent cooling of the liquid and thus prevent rupture of the seal or paneling of the side wall.

DESCRIPTION OF THE PREFERRED EMBODIMENT

Figure 1:
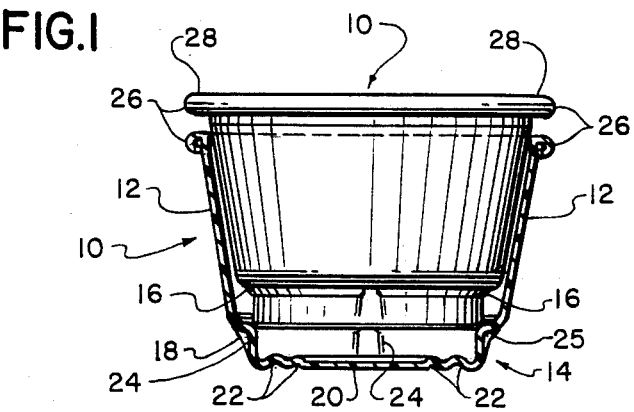
FIG. 1 is a side elevational view of a pair of container bodies embodying the principles of the instant invention, the bodies being shown in nested position with the outer body sectioned to illustrate certain details of construction.
Figure 2:
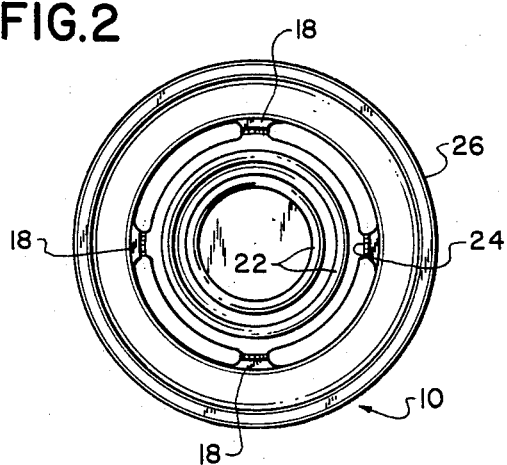
FIG. 2 is a top view of FIG. 1.

Referring to the drawings and in particular to FIG. 1, there is shown a plurality of one piece thermoformed container bodies 10 embodying the principles of the instant invention and disposed in stacked and nested relationship. Each container body 10 has a cup shape and is formed with a tapered main or side wall 12 which at its bottom and merges into a pedestal base, generally indicated by the numeral 14, which forms the bottom end portion of the container. The base 14 includes a rounded corner portion 15 which connects the base 14 and the side wall 12, and an inwardly and downwardly angled reinforcing wall 16 which is disposed at about a 45° angle. The angled wall 16 merges into a short vertical wall 16 which in turn connects with a horizontal or transverse bottom wall 20 which is formed with a plurality of annular grooves or corrugations 22 whose cross-sectional configuration defines means which permit diaphragmatic flexing of the wall 20, as will be hereinafter explained. A plurality of spaced, vertical, inwardly extending indentations 24 which at their upper ends create inwardly extending ledge portions 25 which facilitate non-wedging nesting of the container bodies 10 and which also strengthen the bottom portion of the container body and help to re-enforce it against deformation, are formed in the pedestal base 14.

Figure 3:
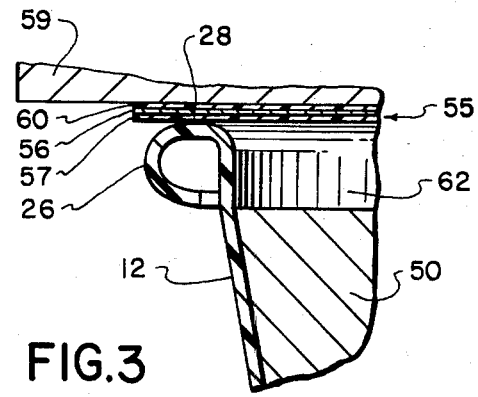
FIG. 3 is an enlarged vertical cross-sectional view taken through the curled lip formed around the periphery of a filled container body, the view also showing portions of the peelable closure disc and a heated sealing plate adapted to heat-seal the disc onto the curled lip.
Figure 4:
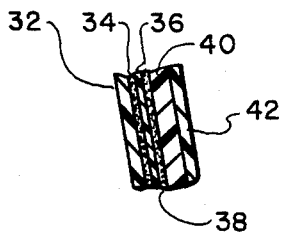
FIG. 4 is an enlarged vertical cross-sectional view taken through the multiple layer wall of the container body.

As best shown in FIG. 3, the top of container body 10 is formed with a peripheral curled lip 26 having a top portion 28. The top portion 28 provides an annular sealing surface which is important from the standpoint of ensuring proper sealing of the container as will become more apparent hereinafter. A flat annular lip, rim or flange or combination thereof with a curled portion may also be used.

The materials used in the construction of container body 10 comprise multiple layers including an inner polyolefin layer 32 made preferably of polyethylene or polypropylene or blends thereof, an adhesive layer 34 made preferably of a compatible material such as a modified polypropylene or a modified polyethylene, a barrier layer 36 made of a plastic material such as ethylene vinyl alcohol copolymer, saran, etc. which is substantially impervious to oxygen, another compatible adhesive layer 38 similar or identical to the layer 34, a bulk layer 40 preferably but not necessarily consisting of reground scrap generated during manufacture of the bodies 10, and an outer polyolefin layer 42 preferably similar or identical in composition to the inner polyolefin layer 32. It will be appreciated that the barrier layer 36 serves primarily to prevent oxygen from penetrating the container after filling and sealing, although it may also serve as a barrier for other gases or fluids. The layer 40 functions primarily to add bulk and strength to the body at low cost. The thicknesses of the various body layers can be varied as desired and required, but it has been found that cup shaped bodies constructed from these multiple layers should have a total thickness of at least 15 mils and preferably of about 20 mils.

In accordance with the invention the container body 10 is filled with a hot liquid product such as jam 50 which has been heated to a temperature up to about 190° F. After filling, the container is sealed with a flat imperforate and impervious closure disc 55 which is preferably made of aluminum foil 56 provided on its undersurface a heat sealable adhesive layer 57 capable of adhering to top portion 28 of the curled lip 26 of the body 10. If desired, a suitable oxygen-impervious thermoplastic material such as ethylene vinyl alcohol copolymer (EVOH) or saran may be substituted for the aluminum foil 56.

The closure disc 55 may be a laminate in which the aluminum foil 56 is laminated on one or both sides to a suitable layer of a protective plastic material such as a nylon, a polyester or a polyolefin, one of which may function as the adhesive 57 which adheres the disc 55 to the annular body portion 28. Preferably, the hot melt adhesive 57 is chosen to provide a peel strength sufficiently low in magnitude to permit easy peeling of the disc 55 from the body 10 when it is desired to open the container. It has been found that T-peel strengths (ASTN D 1876-72) on the order of about three pounds per inch are ideal for the present purpose, since they permit easy opening of the container while at the same time providing sufficient strength to maintain the integrity of the seal during normal processing and handling of the container, as will be more fully described. Substantially higher T-peel strengths than the ideal peel strength such as greater than five pounds per inch will provide the resistance necessary to maintain the seal integrity, but they prevent easy peelability of the closure disc.

The cover disc 55 is preferably formed with a small, integral, radially projecting opening tab 58 and may be applied in any suitable manner as by a flat heated sealing ring or plate 59 which engages the upper layer 60 of the closure disc 55 and presses its peripheral edge portion against the top surface 28, while at the same time heating the disc 55 sufficiently to soften the adhesive 57 and cause it to heat-seal to the top annular surface 28. The contacting surface of the sealing plate 59 may be coated with Teflon or the like to prevent the upper surface of the closure disc 55 from sticking to it.

Figure 6:
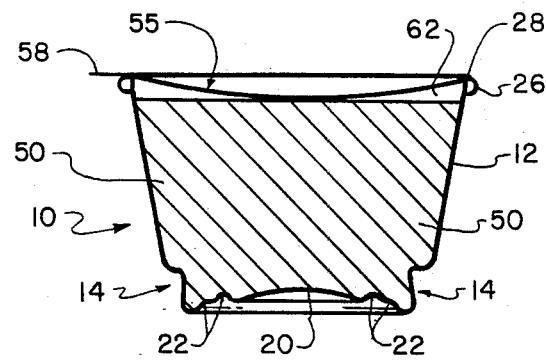
FIG. 6 is a schematic cross-sectional view of the filled and sealed container after the top closure disc and the bottom wall of the sealed container have flexed inwardly as the result of the internal vacuum created by the cooling of the hot filled product.
Figure 5:
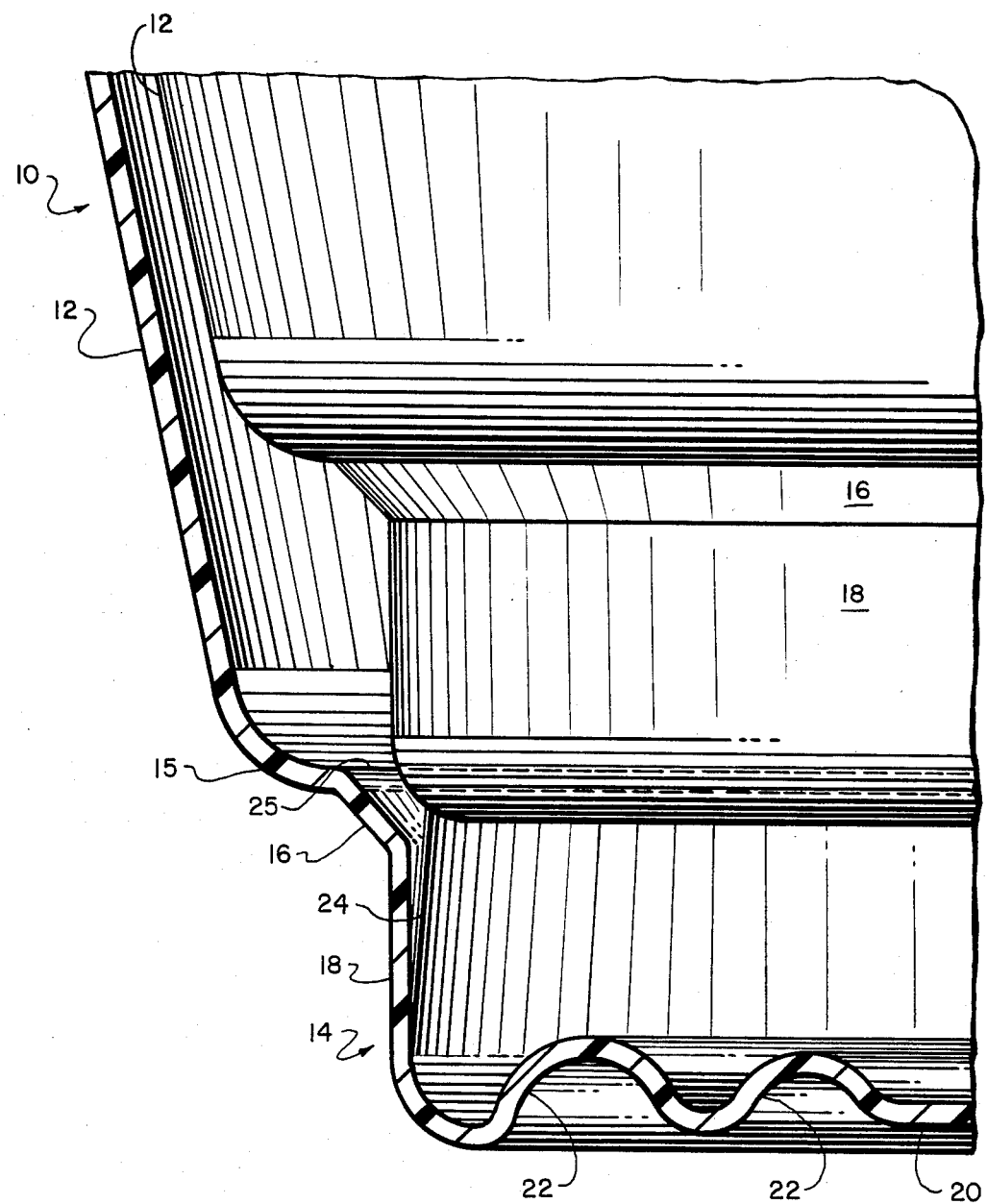
FIG. 5 is an enlarged vertical cross-sectional view taken through a bottom corner portion of the container body.

It will be appreciated that upon subsequent cooling of the hot filed product 50, the closure disc 55 and bottom wall 20 are pressed inwardly by atmospheric pressure as a substantial partial vacuum, is formed within the sealed container due primarily to condensation of moisture vapor which is present in the head space 62 of the filled and sealed container. For a completely rigid container, the vacuum formed upon cooling would be about 20 inches of mercury. The purpose of this container is for use with liquids that have a measurable vapor pressure when hot-filled such that upon cooling, a vacuum is generated. For commerical filling operations, head space 62 is desirable to prevent over-filling of the containers and spilling the contents just prior to the heat sealing operation. It will be further appreciated that because of this inward flexing of the closure disc 55 and bottom wall 20, the partial vacuum is substantially reduced and the stresses on the closure seal and the side wall relieved so that the container seal is maintained and deformation or paneling of the side wall 12 of the container is prevented, as seen illustratively in FIG. 6 and wherein the side wall is free of deformation or paneling throughout its periphery. Annular grooves 22 provide the means for the flexing motion of bottom wall 20. Because the diameter of the pedestal wall 14 as defined is the minimum diameter of the container side, the stiffness at the juncture between the pedestal wall 14 and side wall 12 is stiffened. That stiffness is essential to permit the flexure at the annular grooves 22 and to prevent deformation at the juncture of the pedestal and side wall 12. It should be understood that the high internal vacuum formed within the sealed container also subjects the pedestal base 14 to a high pressure differential, and unless some provision is made to prevent it, could cause it to partially deform inwardly before or at the same time as the bottom wall 20 is being flexed inwardly. This undesirable result is prevented by the reinforcing wall 16 which supports the pedestal base 14 at the area of its greatest vulnerability, and thus limits the inward movement of the body 10 to the inward flexing of the bottom wall 20.

After cooling, and in the proper case solidification of the product 50, the container may be easily opened by having the user grasp the opening tab 59 and pull upwardly on it, thus breaking the adhesive bond and peeling the closure disc 55 from the top sealing surface 28.

What is claimed is:

1. A hot-filled hermetically sealed gas barrier multilayer plastic container with a side wall free of deformation comprising,
   an open-top plastic body of multilayer construction which includes a gas barrier layer substantially impervious to oxygen, said body having:
   (1) an annular sealing surface about the open top,
   (2) a bottom wall having a transverse cross-sectional configuration defining means which permits diaphragmatic flexing thereof inwardly of said body, (3) a side wall free of paneling or deformation notwithstanding said internal vacuum upon cooling of the hermetically sealed hot food product, (4) said bottom wall being disposed in an inwardly flexed position due to internal vacuum, and having gradually moved to said flexed position from a more outward unflexed substantially planar initial position located substantially within the axial length of said plastic body prior to hot filling and sealing while having cooperatively gradually and substantially reduced the substantial or high internal vacuum as it was developing while the hot food product was cooling, a gas barrier impervious flexible closure disc hermetically sealed to the sealing surface by adhesive means defining with said closure disc and body the hermetic seal, which withstands the high internal vacuum which gradually develops upon cooling of and consequent condensation of the moisture vapor of the product, withstands the subsequent substantially reduced internal vacuum, and yet allows easy peel removal of the disc from the sealing surface, said closure disc also being disposed in an inwardly flexed position due to internal vacuum, as allowed by the headspace, and having gradually moved to said flexed position from a more outward unflexed initial position of a substantially flat plane across said sealing surface while also having cooperatively gradually and substantially reduced the high internal vacuum as it was developing, a sterilized hot-fillable food product in the container, said food product having a measureable vapor pressure when hot-filled into the container at a temperature of up to about 190° F. after the container is hermetically sealed, and, a headspace in said container between said food product and the said closure disc when hermetically sealed, said adhesive means, and said cooperative inwardly flexed positions of said closure disc and integral bottom wall together having cooperatively substantially reduced or dissipated the high internal vacuum, and together cooperatively maintaining the substantially reduced internal vacuum in the container, said side wall unpaneled, said hermetic seal unruptured, and said closure disc easily peelable.

2. The container of claim 1 wherein one of said layers is a bulk layer formed at least in part from reground scrap materials of said other layers.

3. The container of claim 1 wherein said adhesive seal for said closure disc has a T-peel strength of from about 3 to 5 pounds.

4. The container of claim 1 wherein said body includes an ethylene vinyl alcohol copolymer as a barrier layer.

5. The container of claim 1 wherein said closure disc includes an ethylene vinyl alcohol copolymer as a barrier layer.

6. The container of claim 1 wherein said body and said closure disc each include an ethlyene vinyl alcohol copolymer as a barrier layer.

7. The container of claim 1 wherein said side wall is of tapering frustoconical configuration throughout a major portion of the axial extent thereof and merging into a generally cylindrical and substantially vertically extending rigid pedestal wall of lesser diameter, said pedestal wall merging into said bottom wall.

8. A container according to claim 7 wherein said pedestal wall is connected to the frustoconical side wall by means of an upwardly and outwardly angularly extending reinforcing wall, said reinforcing wall extending at an angle of about 45° to the container longitudinal axis and wherein further said frustoconical side wall includes at its lower end a downwardly and inwardly curving rounded corner merging into said reinforcing wall.

9. The container of claim 1 further including stacking formations in said side wall and permitting easily separable nesting of a plurality of empty said plastic bodies.

* * * * *